United States Patent [19]

Galbraith

[11] Patent Number: 4,512,355

[45] Date of Patent: Apr. 23, 1985

[54] PROPELLANT AUGMENTED, PRESSURIZED GAS DISPENSING DEVICE

[75] Inventor: Lyle D. Galbraith, Redmond, Wash.

[73] Assignee: Rocket Research Company, Redmond, Wash.

[21] Appl. No.: 450,355

[22] Filed: Dec. 16, 1982

[51] Int. Cl.³ .............................................. B60R 21/08
[52] U.S. Cl. ...................................... 137/68 A; 222/3
[58] Field of Search ..................... 222/3, 394; 280/736; 137/68 A

[56] References Cited

U.S. PATENT DOCUMENTS 3,910,596 10/1975 Wulbrecht et al. .......... 137/68 A X
4,006,919 2/1977 Neuman .............................. 280/736

*Primary Examiner*—Stanley H. Tollberg
*Attorney, Agent, or Firm*—Christensen, O'Connor, Johnson & Kindness

[57] ABSTRACT

A propellant augmented, gas dispensing device of the type that includes a propellant chamber coupled to a pressure vessel containing a pressurized gas and exhaust passage from the propellant chamber incorporates an additional depressurization vessel coupled in fluid communication with the exhaust passage from the propellant chamber. The depressurization vessel has a restricted exhaust passage. The exhaust passage from the propellant chamber is constructed to allow a relating high flow rate from the propellant chamber into the depressurization chamber, permitting rapid depressurization of the propellant chamber to assure propellant extinguishment. At the same time, the restricted exhaust passage from the depressurization vessel permits controlled metering of the outflow of pressurized gas from the dispensing device.

5 Claims, 1 Drawing Figure

PROPELLANT AUGMENTED, PRESSURIZED GAS DISPENSING DEVICE

BACKGROUND OF THE INVENTION

The present invention relates to a propellant augmented, gas dispensing device, and more particularly to such a device that incorporates apparatus for controlling the release of pressurized gas while allowing rapid depressurization of the propellant chamber to assure extinguishment of unused propellant.

Propellant augmented, gas dispensing devices are utilized for a variety of purposes, including the pressurization of inflatable assemblies, such as escape slides, life rafts, and airbag safety cushions in automobiles. Typical gas dispensing devices of this type have first and second chambers. The first chamber is a storage chamber that carries a relatively inert gas under pressure, for example carbon dioxide, while the second chamber carries a solid propellant, for example ammonimum nitrate. The propellant is utilized as an energy source to heat and pressurize the carbon dioxide gas stored in the first chamber to temperatures on the order of 180° F. and pressures on the order of 5000 psi. Normally, the propellant will pressurize the gas in less than one second. When the gas is pressurized, an outlet burst disc in the exhaust passage from the propellant chamber will rupture, allowing the pressurized gas to pass through the propellant chamber and out the exhaust passage to permit the pressurized gas to do useful work, for example inflate a life raft or other suitable assembly.

These propellant augmented, dispensing devices are designed for operation over ambient temperatures ranging from, for example, $-65°$ F. to $160°$ F. At lower temperatures, almost all of the solid propellant charge is required to heat the carbon dioxide to 180° F. and pressurize the gas in the storage vessel to approximately 4000 psi. However, when the dispensing device is at a temperature in the intermediate and upper reaches of the operation range, only a portion of the solid propellant is required to pressurize the gas to the desired pressure. Since it is desired that the pressurized gas dispensed from the device is relatively cool, that is, not much hotter than approximately 180° F., it is necessary that the propellant be extinguished immediately after the outlet burst disc ruptures. The propellant is normally extinguished by assuring rapid depressurization of the propellant chamber.

It is, however, sometimes desirable to meter or restrict the flow of pressurized gas from the gas dispensing device in order to dispense the pressurized gas at a relatively low rate. If a restriction is placed in the exhaust channel from the propellant chamber, rapid depressurization of the propellant chamber cannot be achieved and, thus, unused propellant may continue to burn, undesirably raising the temperature of the gas being dispensed by the device.

SUMMARY OF THE INVENTION

The present invention provides a device that allows the flow from a propellant augmented, gas dispensing device to be metered, while at the same time allowing rapid depressurization of the propellant chamber to assure propellant extinguishment. A pressurized gas dispensing device, of the type in which the present invention can be utilized, includes means defining a first chamber for holding a gas under pressure, means defining a second chamber for holding a propellant, means defining a first flow channel placing the first and second flow chambers in fluid communication, and means defining a second flow channel for exhausting fluids from the second chamber. The improvement provided by the present invention comprises means defining a third chamber in fluid communication with the second flow channel, pressure relief means interposed in the second flow channel to relieve pressure in the second chamber when that pressure reaches a predetermined high pressure, and means defining a third flow channel for exhausting fluid from the third chamber. The third flow channel is sized so as to restrict and control the exhaust flow from the third chamber. The second flow channel is sized to permit a flow of exhaust fluid from the second chamber into the third chamber at a sufficiently high rate to rapidly depressurize and extinguish propellant burning in the second chamber. The third chamber is sufficiently large to receive a sufficient amount of exhaust flow for a sufficient period of time to assure the propellant grain is extinguished.

DETAILED DESCRIPTION OF THE DRAWING

Figure 1:
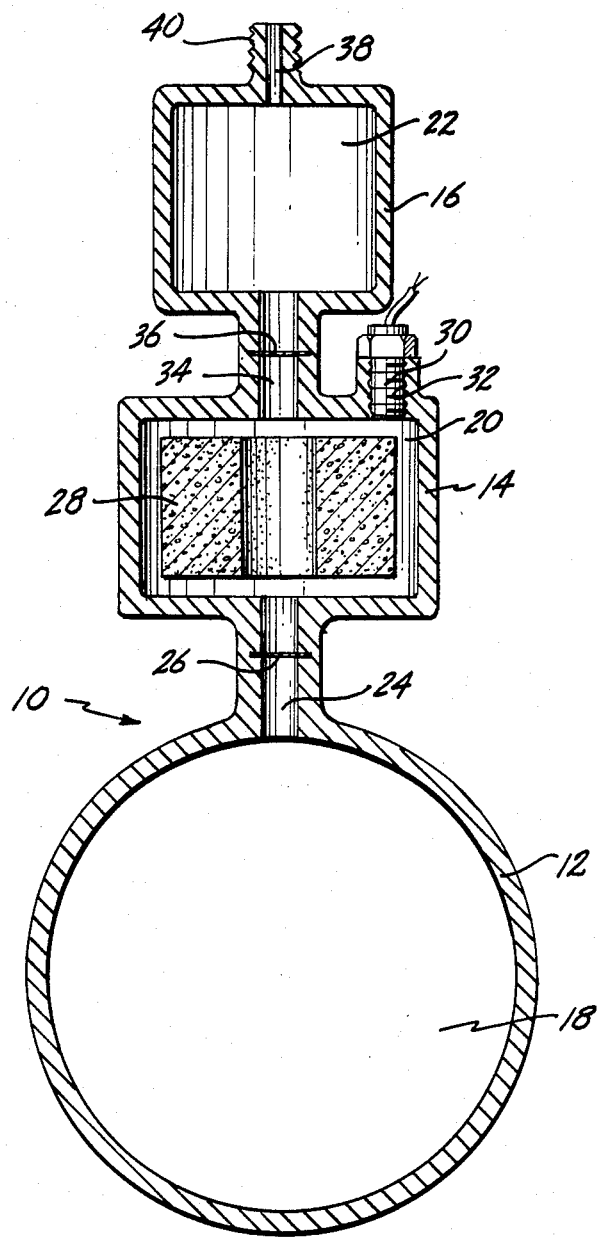

A better understanding of the present invention can be derived by reading the ensuing specification in conjunction with the accompanying drawing wherein:

FIG. 1 is a schematic elevation view in partial section illustrating a propellant augmented, gas dispensing device incorporating the metering exhaust outlet and additional outlet chamber volume to assure extinguishment of the augmenting propellant.

DETAILED DESCRIPTION OF THE INVENTION

Referring to the drawing, the propellant augmented, gas dispensing device 10 of the present invention includes a pressure vessel 12, a breech assembly 14 and depressurization or outlet chamber 16. While these three portions of the gas dispensing device are shown as being integral, it is understood that the pressure vessel, breech assembly and outlet chamber can all be separate sections and are manufactured independently and assembled into the final device. Any conventional means of maufacturing, assembling, and interconnecting can be employed without departing from the broad concepts disclosed herein. Each of the pressure vessel, breech assembly and the pressurization vessel defines an interior volume or chamber, more specifically a pressure chamber 18, a propellant chamber 20 and an outlet chamber 22. A passage 24 interconnects the pressure chamber 18 with the propellant chamber 20.

During assembly, carbon dioxide is placed in the pressure vessel in the form of solid carbon dioxide pellets. A burst disc 26 is immediately thereafter interposed in the passage 24 to normally seal the passage and thus prevent fluid flow from the pressure chamber 18 into the propellant chamber 20. In one embodiment of the invention, the burst disc 26 is designed to rupture at differential pressures on the order from 200 to 400 psi. That is, regardless of the pressure applied in cavity 20 in the direction of cavity 18, the disc will rupture at a differential pressure of about 200 to 400 psi when pressure is applied in cavity 18 in the direction of cavity 20. A suitable burst disc is disclosed in copending application Ser. No. 450,354, filed concurrently herewith. If desired, gases other than carbon dioxide can be employed. Also, the pressure chamber can be charged with a gas after assembly by providing the pressure chamber with an appropriate filler valve.

During assembly, a charge of solid propellant 28 is positioned within the propellant chamber 20. A suitable squib or other firing mechanism 30 is mounted in a squib receiving recess 32 communicating with the propellant chamber 20. The squib can be any of a variety that is conventionally available, including those that are remotely actuated by an electric charge, or one that can be locally activated with a precussion mechanism.

Another passage 34 interconnects the propellant chamber 20 with the outlet chamber 22 in the depressurization vessel 16. Another burst disc 36 is interposed in the second passage 34 to normally seal the passage and prevent fluid flow between the propellant chamber 20 and the outlet chamber 22. In one embodiment of the invention, the second burst disc 36 is designed to rupture at pressures on the order of 5,000 psi.

An exhaust passage 38 communicates between the outlet chamber 22 and the exterior of the depressurization vessel 16. The exhaust passage 38 exits from the depressurization vessel 16 through a threaded coupling 40, which can be affixed to any suitable device to which it is desired to supply or dispense gas. In this embodiment, the flow passages between the pressure chamber and the propellant chamber and between the propellant chamber and the outlet chamber are of equal size. The exhaust passage 38, however, is restricted in size relative to the other flow passages 24 and 34. In this embodiment, the restriction is accomplished by merely making the flow passage diameter smaller than that of the other passages. However, an orifice or other restriction device can be utilized as desired. When the burst disc 36 bursts upon pressurization of the pressure chamber 18, there is sufficient cross-sectional area in the flow passage 34 and volume in the outlet chamber 22 to permit rapid depressurization of the propellant chamber, and thus extinguishment of the propellant 28. In one embodiment, the outlet chamber volume is approximately 10 cubic inches while the cross-sectional area of the flow passage 34 is 0.07 square inches. This sizing of the outlet chamber and flow passage will allow extinguishment of one pound of propellant in approximately 2 milliseconds. The pressurized gas from the pressure chamber 18 can then pass through the propellant chamber 20 into the outlet chamber 22, from which it is metered through exhaust passage 38 into an assembly to be inflated or other assembly to which gas is being dispensed.

In operation, the squib 30 is fired to ignite the propellant 28 in the propellant chamber 20. When the pressure rises sufficiently high to cause the first burst disc 26 to rupture, the propellant reaction products flow into the pressure chamber and pressurize the carbon dioxide or other gas in the pressure chamber 18. When the pressure in the propellant chamber 20 reaches a sufficiently high level, the second burst disc 36 will rupture allowing gas to flow from the propellant chamber into the outlet chamber 22. As this occurs, the propellant chamber is quickly depressurized, extinguishing the propellant 28. The pressurized gas is then dispensed through the exhaust passage 38.

The present invention has been disclosed in relation to a preferred embodiment of the invention. One of ordinary skill will be able to effect various changes, substitutions of equivalents and other alterations without departing from the broad concepts disclosed. Accordingly, it is intended that the Letters Patent granted hereon be limited only the definition contained in the appended claims and equivalents therof.

The embodiments of the invention in which an exclusive property or privilege is claimed are defined as follows:

1. In a pressurized gas dispensing device including:
   means defining a first chamber for holding a gas under pressure;
   means defining a second chamber for holding a propellant;
   means defining first flow passage means placing said first and second chambers in fluid communication, the first flow passage means comprising all fluid communication means between the first and second chambers; and
   means defining second flow passage means for exhausting fluids from said second chamber, the improvement comprising:
   means defining a third chamber in fluid communication with said second flow passage means, the second flow passage means comprising all fluid communication means between the second and third chambers;
   pressure relief means interposed in said second flow passage means to prevent fluid flow through the second flow passage means from the second chamber to the third chamber until the pressure in said second chamber reaches a predetermined high pressure as a result of ignition of propellant in the second chamber, and to thereupon permit said fluid flow through the second flow passage means; and
   means defining third flow passage means for exhausting said third chamber, said third flow passage means being smaller in total cross-section than the second flow passage means and being the sole means for exhausting said third chamber.

2. In a pressurized gas dispensing device including:
   means defining a first chamber for holding a gas under pressure;
   means defining a second chamber for holding a propellant;
   means defining first flow passage means placing said first and second chambers in fluid communication, the first flow passage means comprising all means of fluid communication between the first and second chambers; and
   means defining second flow passage means for exhausting fluids from said second chamber, the improvement comprising:
   means defining a third chamber in fluid communication with said second flow passage means, the second flow passage means comprising all fluid communication means between the second and third chambers;
   pressure relief means interposed in said second flow passage means to prevent fluid flow through the second flow passage means from the second chamber to the third chamber until the pressure in said second chamber reaches a predetermined high pressure as a result of ignition of propellant in the second chamber, and to thereupon permit said fluid flow through the second flow passage means;
   means defining third flow passage means for exhausting said third chamber; and
   the total cross-section of the second flow passage means being much smaller than the volume of the third chamber such that depressurization of the second chamber occurs at a rate sufficient to extinguish the propellant in the second chamber after commencement of said fluid flow through the second flow passage means.

3. The device of claim 2, wherein the third flow passage means is smaller in total cross-section than the second flow passage means.

4. In a pressurized gas dispensing device including:

means defining a first chamber for holding a gas under pressure;

means defining a second chamber for holding a propellant;

means defining first flow passage means placing said first and second chambers in fluid communication, the first flow passage means comprising all fluid communication means between the first and second chambers; and means defining second flow passage means for exhausting fluids from said second chamber, the improvement comprising:

means defining a third chamber in fluid communication with said second flow passage means, the second flow passage means comprising all fluid communication means between the second and third chambers;

pressure relief means interposed in said second flow passage means to prevent fluid flow through the second flow passage means from the second chamber to the third chamber until the pressure in said second chamber reaches a predetermined high pressure as a result of ignition of propellant in the second chamber, and to thereupon permit said fluid flow through the second flow passage means; and means defining third flow passage means for exhausting said third chamber, said third flow passage means being smaller in total cross-section than the second flow passage means and smaller in total cross-section than the first flow passage means, and being the sole means for exhausting said third chamber.

5. In a pressurized gas dispensing device including:

means defining a first chamber for holding a gas under pressure;

means defining a second chamber for holding a propellant;

means defining first flow passage means placing said first and second chambers in fluid communication, the first flow passage means comprising all means of fluid communication between the first and second chambers; and means defining second flow passage means for exhausting fluids from said second chamber, the improvement comprising:

means defining a third chamber in fluid communication with said second flow passage means, the second flow passage means comprising all fluid communication means between the second and third chambers, the ratio of the volume of the third chamber to the total cross-section of the second flow passage means being approximately 10 to 0.07;

pressure relief means interposed in said second flow passage means to prevent fluid flow through the second flow passage means from the second chamber to the third chamber until the pressure in said second chamber reaches a predetermined high pressure as a result of ignition of propellant in the second chamber, and to thereupon permit said fluid flow through the second flow passage means; and means defining third flow passage means for exhausting said third chamber.

* * * * *